(12) United States Patent
Chen et al.

(10) Patent No.: US 11,487,659 B2
(45) Date of Patent: Nov. 1, 2022

(54) DATA STORAGE SYSTEM CAPABLE OF PERFORMING INTERLEAVING SCATTER TRANSMISSIONS OR INTERLEAVING GATHER TRANSMISSIONS

(71) Applicant: Realtek Semiconductor Corp., HsinChu (TW)

(72) Inventors: Yuefeng Chen, Suzhou (CN); Xuanming Liu, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 32 days.

(21) Appl. No.: 17/183,314

(22) Filed: Feb. 23, 2021

(65) Prior Publication Data

US 2021/0279171 A1     Sep. 9, 2021

(30) Foreign Application Priority Data

Mar. 3, 2020   (CN) .......................... 202010139211.9

(51) Int. Cl.
| | |
|---|---|
| *G06F 12/06* | (2006.01) |
| *G06F 13/16* | (2006.01) |
| *G06F 12/0804* | (2016.01) |
| *G06F 12/02* | (2006.01) |

(52) U.S. Cl.
CPC ...... *G06F 12/0607* (2013.01); *G06F 12/0246* (2013.01); *G06F 12/0804* (2013.01); *G06F 13/1673* (2013.01)

(58) Field of Classification Search
CPC ............. G06F 12/0607; G06F 12/0246; G06F 12/0804; G06F 13/1673; G06F 2212/1016; G06F 2212/1032; G06F 12/0284; G06F 13/1684; G06F 12/0806; G06F 12/0893

See application file for complete search history.

(56) References Cited

U.S. PATENT DOCUMENTS

| | | | |
|---|---|---|---|
| 5,388,237 A | 2/1995 | Sodos | |
| 5,525,748 A * | 6/1996 | Kuribayashi | ........ G10H 1/0041 84/645 |
| 8,176,252 B1 | 5/2012 | Alexander | |

(Continued)

FOREIGN PATENT DOCUMENTS

| | | |
|---|---|---|
| TW | 200801955 | 1/2008 |
| TW | 201732568 A | 9/2017 |

*Primary Examiner* — Tasnima Matin
(74) *Attorney, Agent, or Firm* — Winston Hsu

(57) ABSTRACT

A data storage system includes a first memory, a second memory, and a memory controller. The memory controller transmits a first data segment from the first memory to the second memory according to an initial address, adds a first interval value to the initial address to generate a succeeding address, and updates a stream number. When the stream number has not reached a target stream number, the memory controller transmits second data segment from the first memory to the second memory according to the succeeding address, and updates the stream number. When the stream number has reached the target stream number, the memory controller sets the stream number to an initial value, adds an offset value to the initial address to update the succeeding address, and transmits a third data segment from the first memory to the second memory according to the updated succeeding address.

15 Claims, 4 Drawing Sheets

(56) References Cited

U.S. PATENT DOCUMENTS

| | | | |
|---|---|---|---|
| 9,971,524 B1 | 5/2018 | Bruce | |
| 10,216,645 B2 | 2/2019 | Bowler | |
| 2004/0148482 A1* | 7/2004 | Grundy | G06F 13/4256 |
| | | | 711/104 |
| 2009/0276564 A1* | 11/2009 | Wong | G06F 12/0246 |
| | | | 711/E12.001 |
| 2011/0167203 A1* | 7/2011 | Yoshida | G06F 12/0866 |
| | | | 711/E12.019 |
| 2011/0252180 A1* | 10/2011 | Hendry | G06F 3/0604 |
| | | | 711/3 |
| 2017/0153825 A1* | 6/2017 | Cho | G11C 11/1653 |
| 2017/0242626 A1* | 8/2017 | O'Krafka | G06F 3/064 |
| 2020/0218470 A1* | 7/2020 | Cho | G06F 3/061 |
| 2021/0042225 A1* | 2/2021 | Lee | G06F 12/0607 |
| 2021/0081327 A1* | 3/2021 | Yamaguchi | G06F 12/0253 |
| 2021/0279171 A1* | 9/2021 | Chen | G06F 12/0804 |

\* cited by examiner

DATA STORAGE SYSTEM CAPABLE OF PERFORMING INTERLEAVING SCATTER TRANSMISSIONS OR INTERLEAVING GATHER TRANSMISSIONS

BACKGROUND OF THE INVENTION

1. Field of the Invention

The present invention is related to a data storage system, and more particularly to a data storage system capable of performing interleaving scatter transmissions or interleaving gather transmissions.

2. Description of the Prior Art

In an electronic system, an analog-to-digital converter is usually used to identify data transmitted from sensors, such as currents, voltages and temperatures. In prior art, an analog-to-digital converter having multiple channels can be coupled to different data sources or different sensors of the system. Since different data sources or different sensors may retrieve data from corresponding components or nodes periodically, the multi-channel analog-to-digital converter has to convert data transmitted from different sensors or different data sources repeatedly in turns.

In prior art, the multi-channel analog-to-digital converter can store processed data to a first-in first-out (FIFO) storage structure sequentially according to the receiving sequence of data. Then, the data in the first-in first-out storage structure will be sequentially stored to different segments in another memory, that is, an interleaving (scatter) transmission is performed, so different types of data can be processed separately later on.

If the electronic system does not use a direct memory access (DMA) controller, the work of transmitting data must be completed by the central processor unit (CPU). However, if the amount of data to be transferred is rather large, it will occupy the CPU for a long period of time, lowering the calculating speed and efficiency. In addition, since the direct memory access controller does not support interleaving scatter transmission and interleaving gathering transmission, it is difficult to increase the efficiency of data transmission even when the direct memory access controller is used.

SUMMARY OF THE INVENTION

One embodiment of the present invention discloses a method for operating a data storage system. The data storage system includes a first memory, a second memory, and a memory controller.

The method includes the memory controller transmitting a first data segment stored in the first memory to the second memory according to an initial address, the memory controller adding a first interval value to the initial address to generate a succeeding address, and the memory controller updating a stream number. When the stream number has not reached a target stream number, the memory controller transmits a second data segment stored in the first memory to the second memory according to the succeeding address, adds a second interval value to the succeeding address to update the succeeding address, and updates the stream number. When the stream number has reached the target stream number, the memory controller sets the stream number to an initial value, adds an offset value to the initial address to update the succeeding address to generate an updated succeeding address and to update the initial address, and transmits a third data segment stored in the first memory to the second memory according to the updated succeeding address.

Another embodiment of the present invention discloses a data storage system. The data storage system includes a first memory, a second memory, and a memory controller coupled to the first memory and the second memory.

The memory controller transmits a first data segment stored in the first memory to the second memory according to an initial address, adds a first interval value to the initial address to generate a succeeding address, and updates a stream number. When the stream number has not reached a target stream number, the memory controller transmits a second data segment stored in the first memory to the second memory according to the succeeding address, adds a second interval value to the succeeding address to update the succeeding address, and updates the stream number. When the stream number has reached the target stream number, the memory controller sets the stream number to an initial value, adds an offset value to the initial address to update the succeeding address to generate an updated succeeding address and to update the initial address, and transmits a third data segment stored in the first memory to the second memory according to the updated succeeding address.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
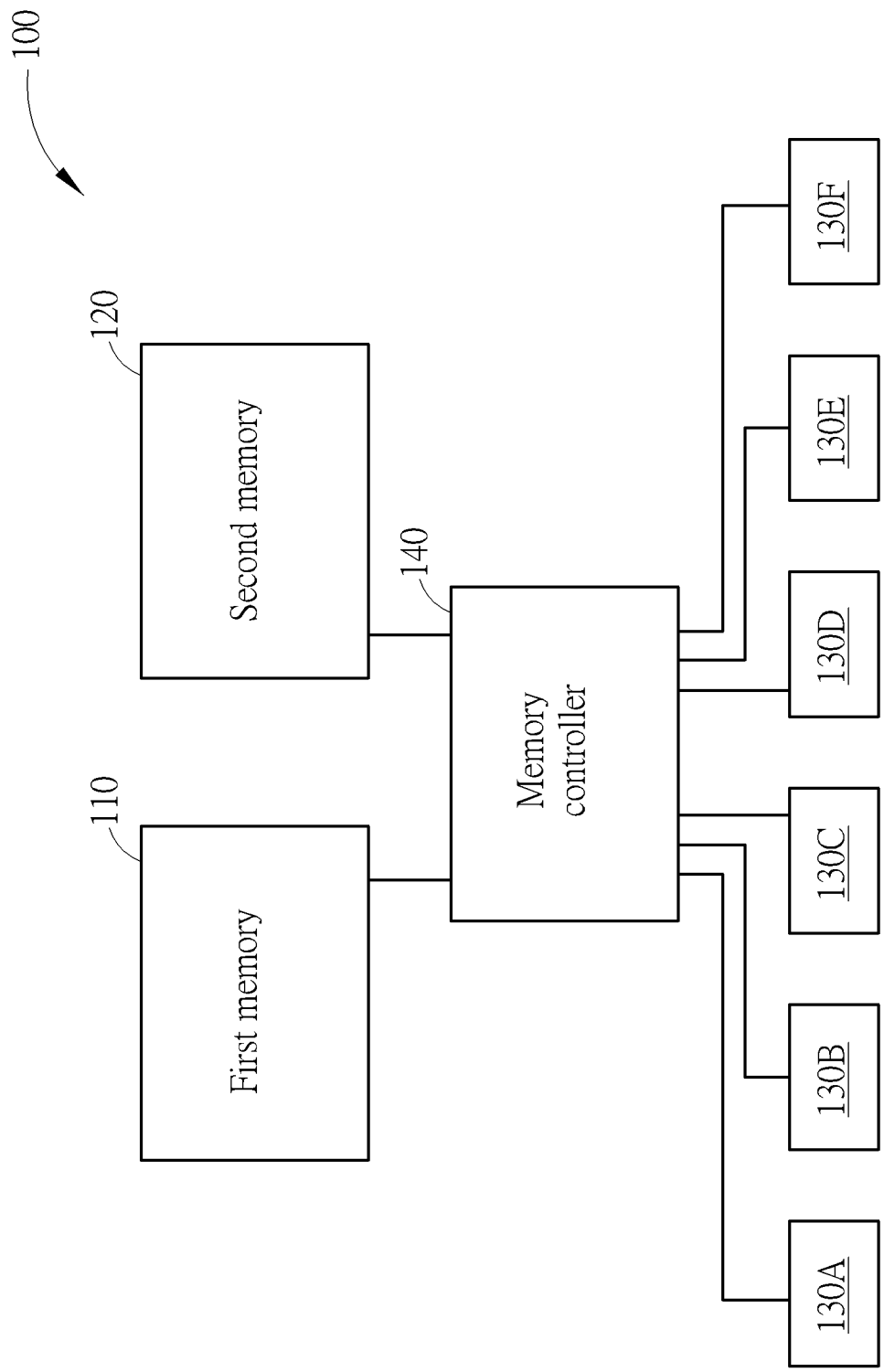
FIG. 1 shows a data storage system according to one embodiment of the present invention.

FIG. 1 shows a data storage system 100 according to one embodiment of the present invention. The data storage system 100 includes a first memory 110, a second memory 120, registers 130A, 130B, 130C, 130D, 130E, and 130F, and a memory controller 140. The memory controller 140 is coupled to the registers 130A, 130B, 130C, 130D, 130E, and 130F, the first memory 110, and the second memory 120. In some embodiments, the memory controller 140 can be, for example, the direct memory access (DMA) controller of the system, and can include a finite state machine (FSM). The memory controller 140 can access the data stored in the first memory 110 and the second memory 120, and transfer data between the first memory 110 and the second memory 120.

Figure 2:
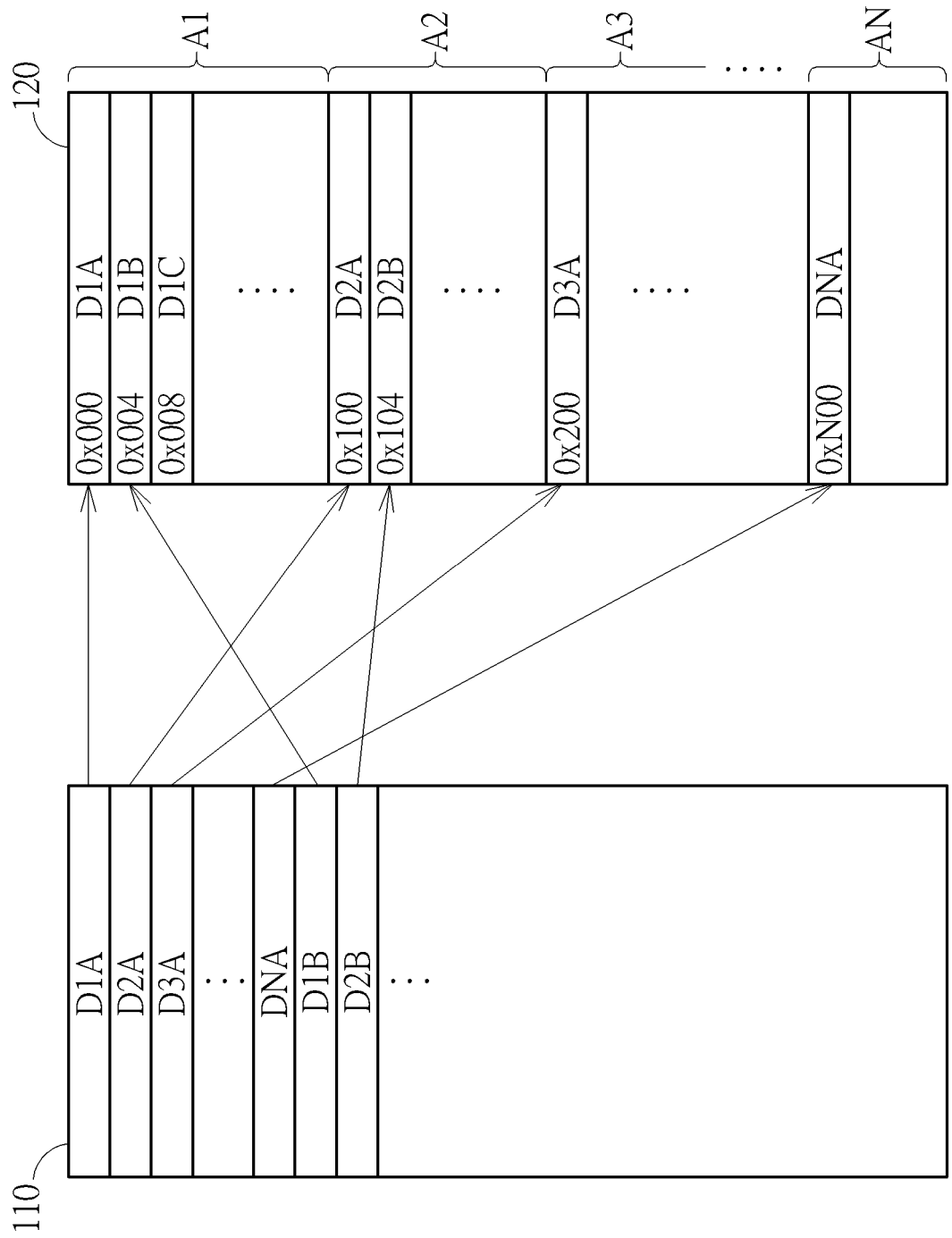
FIG. 2 shows the data storage system in FIG. 1 performing an interleaving scatter transmission.

FIG. 2 shows the data storage system 100 performing an interleaving scatter transmission. In FIG. 2, the first memory 110 can have a first-in first-out (FIFO) structure, and the memory controller 140 can sequentially and cyclically store a plurality of continuous data segments in the first memory 110 to a plurality of scattered address segments A1 to AN in the second memory 120. That is, the memory controller 140 can pop a data segment D1A from the first memory 110 and store the data segment D1A to a first address segment A1 of the second memory 120. Then, the memory controller 140 can pop another data segment D2A from the first memory 110 and store the data segment D2A to a second address segment A2 of the second memory 120, and so on. That is, the memory controller 140 can pop the data segments D3A to DNA from the first memory 110, and store the data segments D3A to DNA to the corresponding address segments A3 to AN of the second memory 120 sequentially. Also, after the data segment DNA is transmitted, the memory controller 140 can further pop a data segment D1B from the first memory 110 and store the data segment D1B to an address in the first address segment A1 of the second memory 120 next to the data segment D1A. Similarly, the memory controller 140 will keep transmitting data segments from the first memory 110 to the second memory 120 until the data transmission amount of the memory controller 140 has reached a target value.

Figure 3:
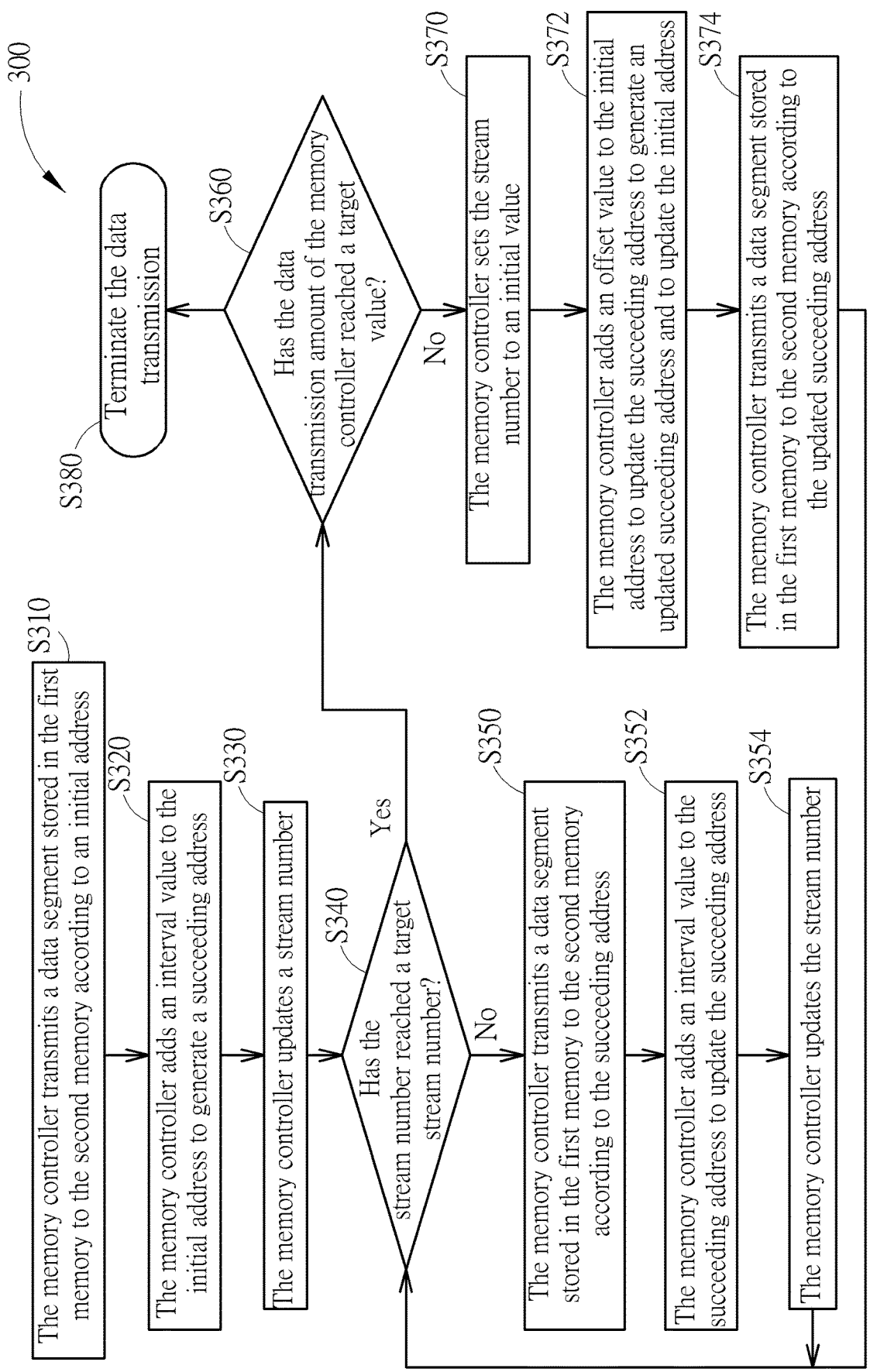
FIG. 3 shows a method for operating a data storage system in FIG. 1 according to one embodiment of the present invention.

FIG. 3 shows a method 300 for operating the data storage system 100 according to one embodiment of the present invention. The method 300 includes steps S310 to S380.

S310: the memory controller 140 transmits a data segment stored in the first memory 110 to the second memory 120 according to an initial address;

S320: the memory controller 140 adds an interval value to the initial address to generate a succeeding address;

S330: the memory controller 140 updates a stream number;

S340: if the stream number has not reached a target stream number, goes to step S360, else go to S350;

S350: the memory controller 140 transmits a data segment stored in the first memory 110 to the second memory 120 according to the succeeding address;

S352: the memory controller 140 adds an interval value to the succeeding address to update the succeeding address;

S354: the memory controller 140 updates the stream number, and go to step S340;

S360: if the data transmission amount of the memory controller 140 has reached a target value, go to step S380, else go to step S370

S370: the memory controller 140 sets the stream number to an initial value;

S372: the memory controller 140 adds an offset value to the initial address to update the succeeding address to generate an updated succeeding address and to update the initial address;

S374: the memory controller 140 transmits a data segment stored in the first memory 110 to the second memory 120 according to the updated succeeding address, and go to step S340;

S380: terminate the data transmission.

In some embodiments, the data storage system 100 can perform the interleaving scatter transmission with method 300. In this case, the initial address used in step S310 can be the address in the second memory 120 where the data segment D1A will be stored. Thus, the memory controller 120 can transmit the data segment D1A from the first memory 110 to the second memory 120, and store the data segment D1A to the initial address of the first address segment A1 in the second memory 120. In some embodiments, according to requirements of different applications, the first data segment D1A can include one piece of data corresponding to one address in the first memory 110 or can include a plurality of pieces of data corresponding to a plurality of continuous addresses. Therefore, in step S310, the memory controller 140 may read a plurality of pieces of data continuously from the first memory 110 to obtain the complete data segment D1A.

In FIG. 2, since the interval value between the initial address 0x100 of the second address segment A2 and the initial address 0x000 of the first address segment A1 in the second memory 120 is 100, the memory controller 140 can, in step S320, add the interval value 100 to the initial address 0x000 to obtain the succeeding address 0x100 in the second memory 120 for storing the next data segment D2A. Furthermore, in the present embodiment, since the memory controller 140 needs to store data segments in the first memory 110 to N address segments A1 to AN in the second memory 120 respectively, there will be N streams during the transmission. In this case, to record which stream is processed currently, the memory controller 140 can update the stream number in step S330. For example, but not limited to, the memory controller 140 can update the stream number from 0 to 1, implying that the data segment D1A has been transmitted to the first address segment A1 of the second memory 120, and the memory controller 140 will perform the transmission of the succeeding data segment D2A.

In some embodiments, the target stream number can be set to the total number of the address segments of the second memory 120. For example, in the present embodiment, the target stream number can be set to N. Since the current stream number is 1 and has not reached the target stream number N; therefore, the result of step S340 will lead to step S350. In step S350, the memory controller 140 will store the data segment D2A obtained from the first memory 110 to the second address segment A2 of the second memory 120 according to the succeeding address generated in step S320. Later, the memory controller 140 will add the interval value 100 to the succeeding address 0x100 to obtain the updated succeeding address 0x200 in step S352. Also, the memory controller 140 will update the stream number in step S354. The stream number can be, for example but not limited to, updated from 1 to 2, and then, step S340 will be performed again. In this case, if the stream number 2 still has not reached the target stream number N, then the memory controller 140 will perform steps S350 to S354 again.

When the data segment DNA has been stored to the $N^{th}$ address segment AN of the second memory 120 and the stream number has been updated from N−1 to N, the result of step S340 will lead to step S360. In this case, if the data transmission amount of the memory controller 140 has reached a target value, it means that the transmission has completed, then the transmission will be terminated in step S380. However, if the data transmission amount of the memory controller 140 has not reached the target value, it means that the memory controller 140 has to keep retrieving data segments from the first memory 110 and store the data segments to the address segments A1 to AN of the second memory 120 respectively. In this case, steps S370 to S374 will be performed.

In step S370, the memory controller 140 can set the stream number to be the initial value. The initial value can be, for example but not limited to, 0. In this case, the data segment D1B retrieved from the first memory 110 should be stored to the first address segment A1 of the second memory 120. However, since the data segment D1A has been stored to the first address segment A1 of the second memory 120 previously, the data segment D1B should be stored to the address following the address where the data segment D1A is stored. Therefore, in step S372, the memory controller 140 will add an offset value to the initial value to update the succeeding address. Also, in step S374, the data segment D1B will be stored to the second memory 120 according to the updated succeeding address. In some embodiments, the first memory 110 and the second memory 120 may have different data widths, and the data segment D1A may occupy the storage space corresponding to several addresses in second memory 120. For example, in FIG. 2, the initial address is 0x000, and the data segment D1A may be stored to the storage space corresponding to addresses 0x000 to 0x003, that is, the data width is 4, and the data segment D1B should be stored to the storage space starting from address 0x004. In some embodiments, when the data segment D1A has been stored as a plurality of continuous pieces of data in the second memory 120, the memory controller 140 can set the offset value according to the number of addresses included by the continuous addresses. Consequently, the interleaving scatter transmission can be performed smoothly without overwriting the data previously stored. Similarly, to ensure that the memory controller 140 can correctly store the data segment D1C to the address 0x008, which is next to where the data segment D1B is stored in the first address segment A1 of the second memory 120, the memory controller 140 can also update the initial address with the sum of the initial address 0x004 and the offset value 4 when step S372 is performed in the next run.

After step S374 is performed, the memory controller 140 can further perform step S340 to keep transmitting the data segments stored in the first memory 110 to the address segments A2 to AN of the second memory 120. Consequently, the data storage system 100 can complete the interleaving scatter transmission with the method 300.

In some embodiments, the address and the values used by the method 300 can be stored to the registers in the data storage system 100. For example, the register 130A can store the initial address, the register 130B can store the succeeding address, the register 130C can store the stream number, the register 130D can store the target stream number, the register 130E can store the data width, and the register 130F can store the interval value.

In FIG. 2, the interval values between each two adjacent address segments of the address segments A1 to AN are the same. For example, the initial address of the address segment A1 is 0x000, the initial address of the address segment A2 is 0x100, and the initial address of the address segment A3 is 0x200. That is, the interval values are all 100, so the interval values used in steps S320 and S352 would be the same. However, in some other embodiments, the interval values between different adjacent address segments may be different. For example, the initial address of the address segment A1 can be 0x000, the initial address of the address segment A2 can be 0x100, and the initial address of the address segment A3 can be 0x300. In this case, the interval values used in steps S320 and S352 may be different, and the data storage system 100 may further include more registers to store the different interval values correspondingly. In some embodiments, since the interval values may be related to the corresponding address segment, which can be indicated by the current stream number, the memory controller 140 can select the corresponding interval values according to the current stream number.

In addition, in FIG. 2, since the first memory 110 has a FIFO structure, the memory controller 140 can retrieve the data by performing pop operations with the same address. However, in some other embodiments, the first memory 110 may have other types of structures, and the memory controller 140 can increment the read address to retrieve a plurality of pieces of data continuously.

Figure 4:
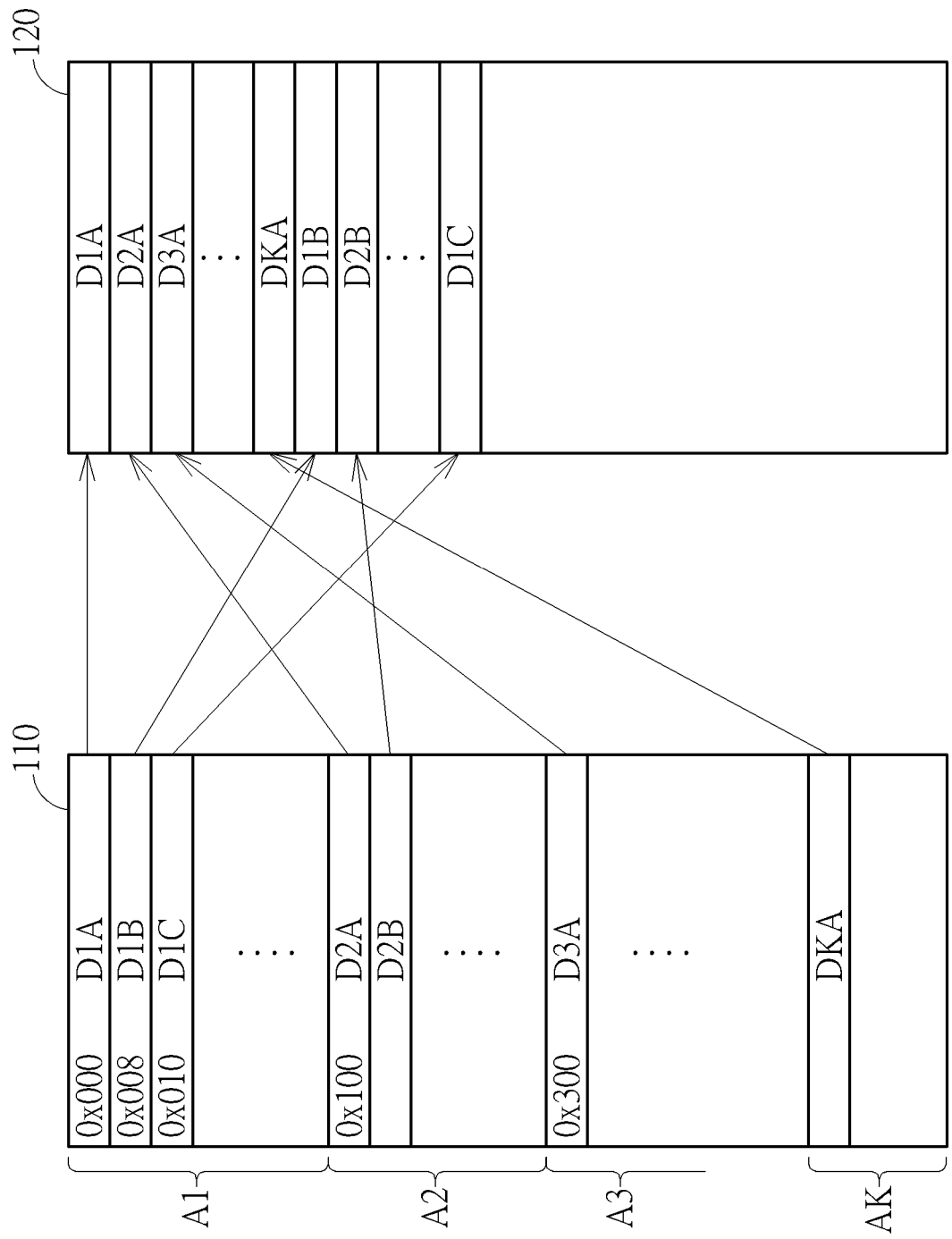
FIG. 4 shows the data storage system in FIG. 1 performing an interleaving gather transmission.

FIG. 4 shows the data storage system 100 performing an interleaving gather transmission. In FIG. 4, the second memory 120 can have a FIFO structure, and the memory controller 140 can sequentially and cyclically transmit the data segments that are scattered in K different address segments A1 to AK in the first memory 110 to the second memory 120. That is, the memory controller 140 can retrieve the data segment D1A from the first address segment A1 in the first memory 110, and transmit the data segment D1A to the second memory 120. Afterward, the memory controller 140 would retrieve the data segment D2A from the second address segment A2 in the first memory 110, and transmit the data segment D2A to the second memory 120, and so on. Similarly, memory controller 140 would retrieve the data segments D3A to DKN from the address segments A3 to AK in the first memory 110 respectively, and push the data segments D3A to DAK to the second memory 120. Then, the memory controller 140 may get back to the first address segment A1 in the first memory 110 to retrieve the data segment D1B, which is stored next to the data segment D1A, and store the data segment D1B to the second memory 120. Afterward, the memory controller 140 would retrieve the data segment D2B from the second address segment A2 in the first memory 110, and transmit the data segment D2B to the second memory 120. The similar process can continue until the transmission amount of the memory controller 140 has reached a target value.

In some embodiments, the data storage system 100 can also adopt the method 300 to perform the interleaving gather transmission. In this case, the initial address used in step S310 can be the address in the first memory 110 where the data segment D1A is stored, so the memory controller 140 can obtain the data segment D1A from the first memory 110 according to the initial address, and transmit the data segment D1A to the second memory 120. In some embodiments, according to requirements of different applications, the first data segment D1A may include one piece of data corresponding to one address in the first memory 110 or a plurality of pieces of data corresponding to a plurality of continuous addresses in the first memory 110. Therefore, in step S310, the memory controller 140 may have to read a plurality of pieces of data continuously from the first memory 110 to obtain the complete data segment D1A.

Later, in step S320, the memory controller 140 can add the interval value to the initial address to generate the succeeding address, that is, the address where the next data segment D2A is stored in the first memory 110. Also, in step S330, the stream number will be updated for the succeeding transmission. In addition, in some embodiments, the target stream number can be set to be the total number of the address segments in the first memory 110. For example, in the present embodiment, the target stream number can be set to K. Furthermore, in FIG. 4, the interval values between each two adjacent address segments in the first memory 110 can be different. For example, the initial address of the address segment A1 is 0x000, the initial address of the address segment A2 is 0x100, and the initial address of the address segment A3 is 0x300. Therefore, the data storage system 100 may use additional registers to record the corresponding interval values, and the memory controller 140 can select the interval values 100 and 200 according to the current stream number, ensuring that the memory controller 140 can retrieve the correct data segments from the correct address segments.

In some embodiments, since the data segment D1A may include a plurality of pieces of data corresponding to continuous addresses in the first memory 110, the memory controller 140 can set the width offset according to the number of addresses in the continuous addresses so as to update the succeeding address correctly in step S372. For example, although the initial address is 0x000 in FIG. 4;

however, the data segment D1A may also include the data stored in the storage space corresponding to addresses 0x001 to 0x007 in the first memory 110. In this case, the width offset would be 8, and the data segment D1B should be retrieved from the address 0x008 in the first memory 110. Consequently, the interleaving gather transmission can be performed smoothly without transmitting repeated data.

In FIG. 4, the second memory 120 can have a FIFO structure, so the memory controller 140 can keep storing the data segments to the second memory 120 by performing push operations with the same address. However, in some other embodiments, the second memory 120 may also have other types of structures, and the memory controller 140 may increment the write data for storing the data segments to the continuous addresses in the second memory 120.

In summary, the data storage system and the method for operating the data storage system provided by the embodiments of the present invention can store the values and parameters required for the transmission to the registers, so the memory controller can automatically read and write data among different address segments of different memories. Therefore, the memory controller can help to implement the interleaving scatter transmission and the interleaving gather transmission, thereby reducing the burden of the central processing unit of the computer system and improving the efficiency of data transmission.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for operating a data storage system, the data storage system comprising a first memory, a second memory, and a memory controller, the method comprising:
   the memory controller transmitting a first data segment stored in the first memory to the second memory according to an initial address;
   the memory controller adding a first interval address value to the initial address to generate a succeeding address;
   the memory controller updating a stream number;
   when the stream number has not reached a target stream number:
      the memory controller transmitting a second data segment stored in the first memory to the second memory according to the succeeding address;
      the memory controller adding a second interval address value to the succeeding address to update the succeeding address; and
      the memory controller updating the stream number; and
   when the stream number has reached the target stream number:
      the memory controller setting the stream number to an initial value;
      the memory controller adding an offset value to the initial address to update the succeeding address to generate an updated succeeding address and to update the initial address; and
      the memory controller transmitting a third data segment stored in the first memory to the second memory according to the updated succeeding address, wherein:
         the memory controller is configured to transmit a plurality of data segments scattered at different address segments in the first memory to the second memory sequentially and cyclically;
         the initial address and the succeeding address are corresponding to addresses of the first memory; and
         the target stream number is a total number of the plurality of address segments.

2. The method of claim 1, wherein:
the first data segment comprises a piece of data corresponding to a specific address in the first memory or a plurality of pieces of data corresponding to a plurality of continuous addresses in the first memory.

3. The method of claim 1, wherein:
the second memory has a first-in first-out (FIFO) structure, and the memory controller pushes a plurality of pieces of data to a second initial address of the second memory; or
the memory controller stores the plurality of pieces of data to a plurality of continuous addresses of the second memory.

4. The method of claim 1, further comprising:
when the first data segment comprises a plurality of pieces of data stored in a plurality of continuous addresses in the first memory, setting the offset value according to a total number of addresses in the plurality of continuous addresses.

5. The method of claim 1, further comprising:
when the stream number has reached a target stream number and a data transmission amount of the memory controller has reached a target value, terminating data transmission.

6. The method of claim 1, wherein the first interval address value is different from the second interval address value.

7. A data storage system comprising:
   a first memory;
   a second memory; and
   a memory controller coupled to the first memory and the second memory, and configured to:
      transmit a first data segment stored in the first memory to the second memory according to an initial address;
      add a first interval address value to the initial address to generate a succeeding address;
      update a stream number;
      when the stream number has not reached a target stream number:
         transmit a second data segment stored in the first memory to the second memory according to the succeeding address;
         add a second interval address value to the succeeding address to update the succeeding address; and
         update the stream number; and
      when the stream number has reached the target stream number:
         set the stream number to an initial value;
         add an offset value to the initial address to update the succeeding address to generate an updated succeeding address and to update the initial address; and
         transmit a third data segment stored in the first memory to the second memory according to the updated succeeding address, wherein:
            the memory controller is further configured to transmit a plurality of data segments scattered at different addresses segments in the first memory to the second memory sequentially and cyclically;

the initial address and the succeeding address are corresponding to addresses of the first memory; and the target stream number is a total number of the plurality of address segments.

8. The data storage system of claim 7, wherein:
the first data segment comprises a piece of data corresponding to a specific address in the first memory or a plurality of pieces of data corresponding to a plurality of continuous addresses in the first memory.

9. The data storage system of claim 7, wherein:
the second memory has a first-in first-out (FIFO) structure, and the memory controller pushes a plurality of pieces of data to a second initial address of the second memory; or
the memory controller stores the plurality of pieces of data to a plurality of continuous addresses of the second memory.

10. The data storage system of claim 7, wherein the memory controller is further configured to set the offset value according to a total number of addresses in the plurality of continuous addresses when the first data segment comprises a plurality of pieces of data stored in a plurality of continuous addresses in the first memory.

11. The data storage system of claim 7, wherein the memory controller is further configured to terminate data transmission when the stream number has reached a target stream number and a data transmission amount of the memory controller has reached a target value.

12. The data storage system of claim 7, wherein the first interval address value is different from the second interval address value.

13. A data storage system comprising:
a first memory;
a second memory; and
a memory controller coupled to the first memory and the second memory, and configured to:
transmit a first data segment stored in the first memory to the second memory according to an initial address;
add a first interval address value to the initial address to generate a succeeding address;
update a stream number;
when the stream number has not reached a target stream number:
transmit a second data segment stored in the first memory to the second memory according to the succeeding address;
add a second address interval value to the succeeding address to update the succeeding address; and
update the stream number; and
when the stream number has reached the target stream number:
set the stream number to an initial value;
add an offset value to the initial address to update the succeeding address to generate an updated succeeding address and to update the initial address; and
transmit a third data segment stored in the first memory to the second memory according to the updated succeeding address, wherein:
the memory controller is further configured to transmit a plurality of continuous data segments stored in the first memory to a plurality of scattered address segments in the second memory sequentially and cyclically;
the initial address and the succeeding address are corresponding to addresses of the second memory; and
the target stream number is a total number of the plurality of address segments.

14. The data storage system of claim 13, wherein:
the first memory has a first-in first-out (FIFO) structure, and the memory controller pops a plurality of pieces of data from a first initial address of the first memory; or
the memory controller retrieves the plurality of pieces of data from a plurality of continuous addresses of the first memory.

15. The data storage system of claim 13, wherein the memory controller is further configured to set the offset value according to a total number of addresses in the plurality of continuous addresses when the first data segment is stored as a plurality of pieces of data to a plurality of continuous pieces of data in the second memory.

* * * * *